UNITED STATES PATENT OFFICE.

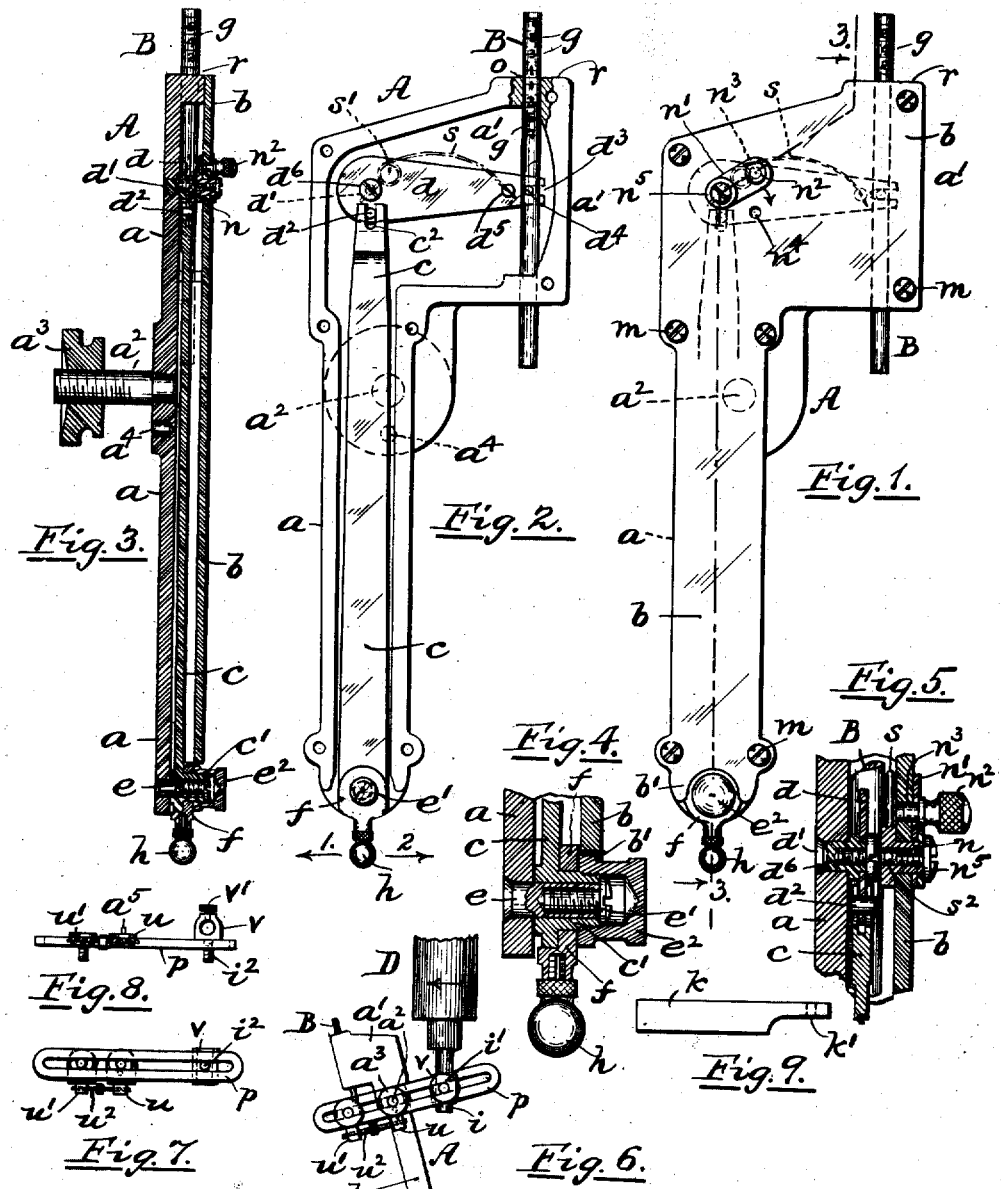

FRANK G. STIMSON, OF PROVIDENCE, RHODE ISLAND.

MEASUREMENT-INDICATING INSTRUMENT.

990,605.  Specification of Letters Patent.  Patented Apr. 25, 1911.

Application filed March 12, 1910.   Serial No. 548,780.

*To all whom it may concern:*

Be it known that I, FRANK G. STIMSON, a citizen of the United States, residing at Providence, in the county of Providence and State of Rhode Island, have invented certain new and useful Improvements in Measurement-Indicating Instruments, of which the following is a specification.

My invention relates to portable tools or instruments constructed and adapted, when in use, for accurately indicating variations or eccentricity in a piece of work from a true center, and it consists in certain novel features of construction and arrangement of the parts, all as more fully hereinafter set forth and claimed.

The objects sought to be attained are to produce a simple and comparatively inexpensive tool of the general type or character referred to and possessing a greater degree of efficiency and accuracy, as well as adaptability to a more extended range of work than other tools or center measurement indicators heretofore devised. That is to say, my improved indicating instrument is capable of being easily and readily used upon machines having revoluble cutter-carrying spindles, as for example milling machines, boring machines, drill-presses, etc. In said instrument I employ an endwise movable graduated indicator-bar, mounted and disposed so that the readings are visible under any and all conditions when the device is in service. The endwise slidable bar element constitutes a novel and important feature of the present invention. In fact, the device may be termed a sliding-bar center indicator for milling machines.

In the accompanying sheet of drawings, Figure 1 represents a front side elevation of my improved center indicating tool complete, the parts being in the normal or central position. Fig. 2 is a corresponding elevation of the device, the front plate or cover being removed. Fig. 3 is a vertical central sectional view, taken substantially on line 3 3 of Fig. 1. Fig. 4 is an enlarged sectional view showing more clearly the corresponding parts represented in Fig. 3. Fig. 5 is also an enlarged sectional view showing more clearly the corresponding parts represented in Fig. 3. Fig. 6 represents in reduced scale a front elevation of the tool detachably connected to the revoluble vertical spindle of a milling or boring-machine, and showing its application in jig work upon a "button" or to a cylindrical piece of stationary work for determining the accuracy of the latter's position with respect to the center of the work-spindle. Fig. 7 is a front view of the attaching device itself (shown in Fig. 6), the indicating-tool being omitted. Fig. 8 is a corresponding top plan view, and Fig. 9 is a side view of a holder member constructed to fit the tool-post of a lathe, the holder being adapted to have the indicator-tool adjustably and removably secured to it.

The following is a detailed description and manner of operation of the center-indicator tool forming the subject of this application for patent.

Again referring to the drawings, A designates the tool as a whole as made of steel or other suitable metal. It is provided with a chambered housing or casing substantially uniform in depth or thickness throughout, the same consisting of the recessed back or base member $a$ and the thin, flat front plate or cover $b$, secured thereto by screws $m$. The shank portion of the casing is comparatively long and narrow and terminates at its upper end in the enlarged chamber head part $a^1$, having the indicator bar B, provided with two independent series of graduations $g$, mounted and longitudinally slidable therein. The face $r$ of the upper end of the part $a^1$ is trued off so as to register accurately with the zero or median line $o$ of the gage when the several movable elements of the device are in the central or normal position. See Fig. 2.

It may be stated here that, as drawn, the relative leverage of the two connected main or primary and secondary swinging arms or levers $c$ and $d$ to each other (soon to be described) and to the contact point member $h$ and bar B are such that the ratio of movement is 60 to 1, the divisions or readings formed on the bar being correspondingly multiplied, or, in other words, a lateral variation of the point member $h$ from the true or normal central position would cause the bar to move correspondingly. If the point swings outwardly (see arrow 1 Fig. 2) say one-thousandth of an inch, the bar will move upward from the zero position until the figure 1 of the lower gage is exposed and registers with the face $r$, thereby clearly and visibly indicating to the observer or user that the work is out of true one-thousandth of an inch. Conversely, if the point is swung inwardly (see arrow 2), a corresponding distance, the bar will thereby be moved downwardly until the figure 1 of the upper gage registers with the surface $r$. The said lever member $c$ extends downwardly in the casing, its lower end having a screw-threaded hub $c^1$ bored to fit the pivot-pin $e$ fixed in the base $a$, a screw $e^1$ (Fig. 4) tapped into the front end of the pin serving to keep the lever in position laterally. The said contact point member $h$ may have any suitable shape desired; the drawings representing it as being spherical. It is removably secured to a holder element $f$ bored to fit the said hub $c^1$, and is axially movable thereon, a milled nut $e^2$, coöperating with the screw-threaded part of the hub, being employed for clamping the member $h$ in position when adjusted. The adjacent portion of the cover is cut away at $b^1$ to receive the nut. The upper end of lever $c$ is forked and provided with an open central slot $c^2$, engaged by the short transverse pin $d^2$, suitably fixed in the thin horizontal bar-carrying lever $d$, mounted in the upper or head portion $a^1$ of the indicator. The said arm or lever $d$ is mounted to swing on a shouldered pivot-pin $d^1$ fixed in the base member $a$, a screw $d^6$ tapped into the pin maintaining the lever in position. The outer or free end of lever $d$ extends through the indicator-bar and is operatively connected to it by means of a pin $d^4$ passing transversely through both members, the lever element having an open radial slot $d^3$ for the pin; the length of the slot exceeding the versed sine of the lever's angular movement, all as clearly represented.

I prefer to further provide the lever $d$ with a wire spring $s$, having a coil $s^1$, one end of the wire being mounted in a pin $d^5$ of the lever, its other end passing through a hole $s^2$ formed in the inner head of a shouldered stud $n$, movably mounted in the cover $b$; the axis of the stud and said pin $d^1$ being in alinement with each other, see Fig. 5. A thin, flat outer spring-plate $n^1$ is fixed to the hub of stud $n$, its free end having a headed pin $n^2$ secured thereto and extending into a shallow hole $n^3$ formed in the cover $b$. By means of this construction, the normal tendency of the spring $s$ in the position shown is to swing the lever $d$ and bar B upwardly, while at the same time insuring contact of the point $h$ with the surface of the work when the instrument is used for indicating, corresponding with arrow direction 1, Fig. 2. When it is oppositely employed (see arrow direction 2, Fig. 2) the pin $n^2$ is withdrawn from hole $n^3$ and swung downwardly until it springs into the registering hole $n^4$, Fig. 1, thereby correspondingly reversing the normal action of spring $s$ with respect to its former position.

The center screw $n^5$ tapped into stud $n$ serves to maintain the plate $n^1$ in place laterally upon the stud.

In Fig. 6 my improved center indicator instrument A is represented as being employed in connection with the revoluble vertical spindle D of, say a milling machine. In this case the indicator is adjustably secured to an elongated slotted frame $p$, in turn adjustably clamped to a holder member $v$, drilled to receive the lower reduced end portion $i$ of the plug member of the vertical spindle. The holder is secured to the spindle by means of a screw $v^1$, Fig. 8, and to the frame itself by a nut $i^1$ (Fig. 6) fitted to the screw-threaded stem $i^2$ passing through the frame. See also Figs. 7 and 8. The indicator has a fixed, screw-threaded stem $a^2$ extending at right angles from the back of the base member $a$ (Fig. 3), provided with a nut $a^3$, thereby adapting it to be clamped to the element $p$ or other analogous supporting means. The frame $p$ is provided with a pair of dogs or collars, $u$, $u^1$, slidably mounted therein, each having an extension on its under side tapped to receive the respective end portion of a right and left-hand screw $u^2$; the latter being interposed between the collars. By means of this arrangement the indicator may be very accurately set or adjusted with respect to the spindle and work. The stem $a^2$ extends through the collar $u$, the nut $a^3$ securing it in place. In order to positively prevent the indicator from moving axially, the collar is provided with a fixed dowel-pin $a^5$, adapted to extend into a corresponding hole $a^4$ formed in the base.

Now, upon rotating the spindle D, the indicator itself having been previously attached to it and approximately adjusted, the point element $h$, contacting lightly with the normally stationary cylindrical article or piece of work $w$ (Fig. 6) to be tested will, in coöperation with the compound levers $c$, $d$, and spring $s$, cause the bar B to slide endwise up or down in the head $a^1$, corresponding with the slight variation, if any, of the center of the work from the true or spindle-center, thereby at the same time exposing the readings of the gage or index $g$, which may then be readily observed and noted. The indicator may be employed for determining the accuracy of the cylindrical surface; that is, whether its periphery is absolutely concentric with the center, and also for accurately centering the work with respect to cutting tools, as for example, a drill mounted in a revoluble spindle, or even a stationary tool coöperating with revolving work.

The indicator may be used in connection with a lathe. In such case, its screw-threaded stem $a^2$ is inserted through a hole $k^1$ (Fig. 9) formed in the free end of a holder $k$, in turn adapted to be secured in the usual tool-post. The nut $a^3$ may be employed for securing the indicator in position when adjusted.

I claim as my invention and desire to secure by U. S. Letters Patent:

1. As an improved article of manufacture an indicator instrument of the general character described, the same comprising an elongated casing or hollow body having one end portion provided with a lateral extension, an indicator-bar movably mounted in and projecting through said extension, an angularly movable member or contact element pivotally mounted in the other end portion of the casing adapted when in use to engage the work or object being tested, and movement-multiplying mechanism located in the casing and operatively connected with said indicator-bar and contact element, for the purpose set forth.

2. The combination, in a center-indicator instrument of the character described, of a longitudinally movable scale-bearing bar, a pivotally mounted lever having its free end engaging the bar, a pivoted main lever having its longer arm in operative engagement with the first-named lever, and a contact element secured to the main lever at a point relatively close to the latter's fulcrum.

3. A portable indicator instrument of the character described, adapted to be detachably secured to machine tools, as for example, lathes, boring-machines, milling machines, etc., the same consisting of a hollow casing, a comparatively long lever member fulcrumed in one end portion of the casing, a relatively short point element adjustably secured to and movable with the lever, a suitably graduated, longitudinally movable indicator-bar mounted in and extending through the walls of the opposite end portion of the casing so that upon moving said bar its graduations are exposed and may be read with respect to a stationary or fixed part, and a fulcrumed member $d$ disposed at substantially right angles to the longitudinal axes of and operatively connecting said lever and bar members, constructed and arranged whereby the angular movements of the point element cause the said bar to move simultaneously with it a predetermined greatly increased distance.

4. In an indicator instrument of the character described, a suitable casing, and an indicator-bar longitudinally slidable therein, having its surface provided with a pair of oppositely disposed index scales, each readable from a central or median zero line, in combination with a movable point element adapted, when in use, to engage the work being tested, a relatively long lever having said point element secured thereto, and a fulcrumed member $d$ in operative engagement with said lever and indicator-bar arranged at substantially right angles to the longitudinal axes of both, substantially as described.

5. In an indicator instrument of the character described, the combination of an endwise slidable indicator-bar, provided with index graduations, a pivotally mounted point or contact element, a movement-multiplying means in operative engagement with the bar and point members, a stud, a spring coöperating with the bar and mounted in the stud adapted, when in use, to press the bar in one direction, and at the same time serving to press the point element against the work being tested, and means, consisting of an angularly movable plate having said stud secured thereto and a locking-pin carried by the plate, for changing the position of the spring so as to press the bar in a direction contrary to its former one when the relation of the point element to the work is correspondingly changed.

In testimony whereof I have affixed my signature in presence of two witnesses.

FRANK G. STIMSON.

Witnesses:
GEO. H. REMINGTON,
CALVIN H. BROWN.

---

Copies of this patent may be obtained for five cents each, by addressing the "Commissioner of Patents, Washington, D. C."